(12) United States Patent
Alterman

(10) Patent No.: US 9,390,188 B2
(45) Date of Patent: Jul. 12, 2016

(54) METHODS AND DEVICES FOR INFORMATION EXCHANGE AND ROUTING

(75) Inventor: Eric Alterman, Jupiter, FL (US)

(73) Assignee: Flow Search Corp., Jupiter, FL (US)

( * ) Notice: Subject to any disclaimer, the term of this patent is extended or adjusted under 35 U.S.C. 154(b) by 139 days.

(21) Appl. No.: 13/408,197

(22) Filed: Feb. 29, 2012

(65) Prior Publication Data

US 2012/0221953 A1 Aug. 30, 2012

Related U.S. Application Data

(63) Continuation-in-part of application No. 13/085,239, filed on Apr. 12, 2011, now Pat. No. 8,819,070.

(60) Provisional application No. 61/323,177, filed on Apr. 12, 2010.

(51) Int. Cl.
G06F 17/30 (2006.01)
G06Q 30/02 (2012.01)

(52) U.S. Cl.
CPC ...... *G06F 17/3089* (2013.01); *G06F 17/30997* (2013.01); *G06Q 30/02* (2013.01)

(58) Field of Classification Search
CPC .................................................. G06F 17/3089
See application file for complete search history.

(56) References Cited

U.S. PATENT DOCUMENTS

| 7,266,491 | B2 | 9/2007 | Humphreys et al. | |
|---|---|---|---|---|
| 8,064,583 | B1 * | 11/2011 | Sutaria et al. | 379/201.02 |
| 8,185,830 | B2 * | 5/2012 | Saha et al. | 715/762 |
| 8,200,775 | B2 * | 6/2012 | Moore | 709/217 |
| 8,433,999 | B2 * | 4/2013 | Hicks et al. | 715/234 |
| 8,700,776 | B2 * | 4/2014 | Rasmussen et al. | 709/226 |
| 2003/0115116 | A1 * | 6/2003 | Crampton | 705/27 |
| 2005/0027512 | A1 | 2/2005 | Waise | |
| 2005/0091220 | A1 * | 4/2005 | Klemow | 707/10 |
| 2005/0102260 | A1 * | 5/2005 | Spring et al. | 707/1 |
| 2006/0265489 | A1 * | 11/2006 | Moore | 709/223 |
| 2007/0033221 | A1 | 2/2007 | Copperman et al. | |
| 2007/0078642 | A1 | 4/2007 | Weng et al. | |
| 2007/0106627 | A1 * | 5/2007 | Srivastava et al. | 706/20 |
| 2008/0244091 | A1 * | 10/2008 | Moore et al. | 709/246 |
| 2008/0270481 | A1 * | 10/2008 | Augustine | 707/200 |
| 2009/0055419 | A1 * | 2/2009 | Gibbon et al. | 707/101 |
| 2009/0055460 | A1 * | 2/2009 | Hicks et al. | 709/201 |
| 2009/0276503 | A1 * | 11/2009 | Renger et al. | 709/217 |
| 2010/0242085 | A1 * | 9/2010 | Dutta et al. | 726/1 |

(Continued)

FOREIGN PATENT DOCUMENTS

EP 2386970 A1 * 11/2011
WO WO 2010062677 A2 * 6/2010

OTHER PUBLICATIONS

Unix Programmer's Manual. Murray Hill, New Jersey., Bell Telephone Laboratories, Incorporated., 1979.*

*Primary Examiner* — Sherief Badawi
*Assistant Examiner* — Jesse P Frumkin
(74) *Attorney, Agent, or Firm* — Goodwin Procter LLP

(57) ABSTRACT

Method and device for information exchange and routing by providing items of information that are organized in discrete flows to third parties. Relationships are defined among the flows such that at least one item of information in at least a first discrete flow is selectively copied to at least a second discrete flow. This allows users to easily discover and exchange real-time items of information across applications.

35 Claims, 10 Drawing Sheets

(56) References Cited

U.S. PATENT DOCUMENTS

| | | |
|---|---|---|
| 2011/0184718 A1 | 7/2011 | Chen |
| 2011/0296291 A1 | 12/2011 | Melkinov et al. |
| 2012/0072815 A1* | 3/2012 | Tsai et al. ............... 715/202 |
| 2012/0117459 A1* | 5/2012 | DeHaven et al. ........... 715/234 |
| 2012/0284290 A1* | 11/2012 | Keebler et al. ............ 707/756 |
| 2014/0006931 A1* | 1/2014 | Pettitt et al. ............. 715/234 |

* cited by examiner

FIG. 8

THE FLOW – APPICATION DIRECTORY

APPLICATION FLOWS
NAME: INCOMING RATING
PATH: /APPS/COFFEERATE/INCOMING_RATINGS

IDENTITY FLOWS
NAME: YOUR RECOMMENDATIONS
PATH: RECOMMENDATIONS
DESCRIPTION: COFFEE YOU MAY LIKE

DROP ELEMENTS:
| NAME | CLASS | DESCRIPTION | REQUIRED |
|---|---|---|---|
| THIS USER FLOW HAS NO DROP ELEMENTS | | | |

NAME: FAVORITE COFFEE RATINGS
PATH: FAVORITES
DESCRIPTION: YOUR FAVORITE RATINGS

DROP ELEMENTS:
| NAME | CLASS | DESCRIPTION | REQUIRED |
|---|---|---|---|
| THIS USER FLOW HAS NO DROP ELEMENTS | | | |

NAME: COFFEE RATINGS
PATH: RATINGS
DESCRIPTION: ALL OF YOUR RATINGS

DROP ELEMENTS:
| NAME | CLASS | DESCRIPTION | REQUIRED |
|---|---|---|---|
| TITLE | STING | RATING TITLE | TRUE |
| DESCRIPTION | STRING | DESCRIBE THE COFFEE... | FALSE |
| ACIDITY | INTEGER | RATE THE ACIDITY | FALSE |
| BITTERNESS | INTEGER | RATE THE BITTERNESS | FALSE |

APPLICATION TRACKS
THERE ARE CURRENTLY NO APPLICATION TRACKS FOR THIS APPLICATION

IDENTITY TRACKS
SOURCE FLOW: RATINGS
DESINATION FLOW: /APPS/COFFEERATE/INCOMING_RATINGS
FILTER: UNFILTERED

*FIG. 10*

METHODS AND DEVICES FOR INFORMATION EXCHANGE AND ROUTING

CROSS-REFERENCE TO RELATED APPLICATIONS

This application claims priority to and is a continuation in part of U.S. patent application Ser. No. 13/085,239, filed Apr. 12, 2011, which claims priority to U.S. Provisional Patent Application No. 61/323,177, filed on Apr. 12, 2010, the entire disclosures of which are incorporated by reference.

FIELD OF THE INVENTION

The present invention relates generally to methods and devices for information exchange and routing, and in particular to the selective copying of information items among discrete information flows.

BACKGROUND OF THE INVENTION

The information available from individuals and enterprises has grown dramatically in both complexity and volume in recent years. As a consequence, it is increasingly difficult to provide and organize this ever-growing wealth of information. To address this, a multitude of tools have been developed to organize information, e.g., hashtags, hyperlinks, distributed file systems, etc.

While these tools may provide users with a large database of information, they are limited in functionality and scalability. For example, several of the platforms merely provide the users with a pool of unorganized and broad tags which users must manually search. Other platforms only allow users to discover information based on the source of the information. Overall, these platforms do not provide a manner in which users of the system may easily discover arbitrarily-defined pools of information as soon as the information is published. The users' ability to find particular items of information on these platforms becomes more frustrated as the amount and complexity of information expands over time. This is especially challenging for some platforms that require the manual tagging of information before that information is made available to users.

Accordingly, there is a need for improved methods and devices for information exchange that allow users to easily discover and share real-time sets of arbitrarily-organized information across applications.

SUMMARY OF THE INVENTION

Embodiments of the present invention provide a method and device for information organization and exchange by providing a data store of interconnected items of information that together form an intent-driven taxonomy. This allows users to easily discover and exchange real-time items of information across applications. Embodiments of the present invention allow publishers of any content type to connect with potential subscribers to that particular content.

In one aspect, embodiments of the present invention provide an apparatus for organizing information comprising a data store, a receiver interface and a transmitter interface. The data store includes a plurality of interconnected items of information, where each item of information is associated with at least one item of meta-information. The receiver interface of the apparatus is adapted to receive at least one item of information associated with at least one item of meta-information and to add this item of information to the data store. In addition, the transmitter interface is adapted to traverse items of meta-information and to provide associated items of information to a receiver external to the data store. The items of information that are in the data store form a taxonomy with root entries in the taxonomy associated with verbs and lower level entries in the taxonomy associated with descriptors or nouns associated with higher level entries in the taxonomy.

In one embodiment of the present invention, the data store processes an item of information to identify an interconnected item of information and provides the interconnected item to a receiver external to the data store. In another embodiment, the apparatus further include a syndication mechanism for receiving information and meta-information from the receiver interface and subsequently providing the received information and meta-information to at least one external receiver (such as an application, a user of an application, etc.) utilizing the transmitter interface. Each item of information in these apparatus may also be associated with at least one permission. In a further embodiment, the receiver external to the data store makes the information it receives available to a second receiver external to the data store.

In additional embodiments of the present invention, the apparatus further includes a republisher that copies at least part of a first item of information in the data store to a second item of information in the data store based on a predefined rule. The predefined rule may include at least one criterion selected from the group consisting of a source location, a destination location, and at least one characteristic for testing the information. The republisher may copy the information upon the addition of the first item of information to the data store. In addition, in the course of copying, the republisher of one embodiment may transform the information.

In still another embodiment of the present invention, the apparatus comprises at least one additional data store that includes a plurality of interconnected items of information and where each item of information is associated with at least one item of meta-information. In one embodiment, at least one item of information in the data store is connected with at least one item of information in at least one additional data store.

In another aspect, embodiments of the present invention provide a method for organizing information and include, first, a step of providing a data store comprising of a plurality of interconnected items of information where each item of information is associated with at least one item of meta-information. The plurality of items forms a taxonomy where the root entries in the taxonomy are associated with verbs and the lower level entries in the taxonomy are associated with descriptors or nouns associated with higher level entries in the taxonomy. The method further includes the steps of receiving at least one item of information associated with at least one item of meta-information; and storing the received information and meta-information in the data store.

In certain embodiments, the methods further include processing an item of information to identify an associated item of information and providing the associated item to a receiver external to the data store (such as an application, a user of an application, etc.). Other embodiments further comprise a step of syndicating the received information and meta-information to at least one external receiver. Each item of information in the data store may also be associated with at least one permission. In a further embodiment, the receiver external to the data store makes the information it receives available to a second receiver external to the data store.

In still another embodiment, the methods further include copying at least part of a first item of information in the data store to a second item of information in the data store based on a predefined rule. The predefined rule in some of these methods may include least one criterion selected from the group consisting of a source location, a destination location, and at least one characteristic for testing the information. The copying, for example, may occur upon the addition of the first item of information to the data store. The information, also, may be transformed in the course of copying the information in some embodiments.

In yet another embodiment, the methods further includes the step of providing at least one additional data store comprising a plurality of interconnected items of information where each item of information associated with at least one item of meta-information. Furthermore, at least one item of information in the data store may be connected with at least one item of information in at least one additional data store.

In another aspect, embodiments of the present invention provide a computing device for information exchange and routing. The device includes a memory storing computer-executable instructions, a processing unit for executing the computer-executable instructions stored in the memory, and a user interface for receiving commands from a user of the computing device. Execution of the computer-executable instructions results in an application selectively providing items of information to third parties. The items of information are organized in discrete flows. Execution of the computer-executable instructions also results in the definition of a relationship among a plurality of flows such that at least one item of information in at least a first discrete flow is selectively copied to at least a second discrete flow.

In one embodiment, at least one item of information comprises a field, and the selective copying of at least one item of information includes copying at least one item of information having a value in the field that matches a specified value. In some embodiments, the field may be either required or optional.

In another embodiment, at least one of the first discrete flow and the second discrete flow is owned by an application. In other embodiments, one of the first discrete flow and the second discrete flow comprises content sourced from a community of identities. In a further embodiment, at least one of the first discrete flow and the second discrete flow is owned by an individual identity. In yet another embodiment, one of the first discrete flow and the second discrete flow comprises reference information. In further embodiments, the at least one item of information is published to the first discrete flow by at least one of an application, an identity, a community system, and another discrete flow.

In still another embodiment, the selective copying further includes performing at least one rule-based operation on the at least one item of information. The rule-based operation may include transformation, enhancement, and/or redaction. In further embodiments, the selective copying further includes selectively copying at least two items of information from at least two discrete source flows to a discrete target flow. In other embodiments, the selective copying further includes selectively copying at least one item of information from a discrete source flow to at least two discrete target flows. In some embodiments, the selective copying is performed automatically and in real-time.

In yet another embodiment, the execution of the computer-executable instructions further results in the definition of a relationship between the first discrete flow and the second discrete flow. The definition includes a track for listening for new items of information published to the first discrete flow and selectively copying at least one of the new items of information to the second discrete flow.

In a further embodiment, the execution of the computer-executable instructions further results in the definition of permissions for an entity. The permissions indicate an ability of the entity to modify parameters associated with at least one flow in the plurality of flows. The parameters may determine whether the at least one flow is discoverable by other flows in the plurality of flows.

In another aspect, embodiments of the present invention provide a method, implemented on at least one computing device, for information exchange and routing. The at least one computing device includes at least one memory storing computer-executable instructions, and at least one processing unit for executing the computer-executable instructions stored in the memory. The execution of the instructions results in the at least one computing device performing the steps of receiving commands from a user of the at least one computing device, selectively providing items of information to third parties, the items of information being organized in discrete flows, and defining a relationship among a plurality of flows such that at least one item of information in at least a first discrete flow is selectively copied to at least a second discrete flow.

In one embodiment, at least one item of information comprises a field, and the selective copying of at least one item of information includes copying at least one item of information having a value in the field that matches a specified value. In some embodiments, the field may be either required or optional.

In another embodiment, at least one of the first discrete flow and the second discrete flow is owned by an application. In other embodiments, one of the first discrete flow and the second discrete flow comprises content sourced from a community of identities. In a further embodiment, at least one of the first discrete flow and the second discrete flow is owned by an individual identity. In yet another embodiment, one of the first discrete flow and the second discrete flow comprises reference information. In further embodiments, the at least one item of information is published to the first discrete flow by at least one of an application, an identity, a community system, and another discrete flow.

In still another embodiment, the selective copying further includes performing at least one rule-based operation on the at least one item of information. The rule-based operation may include transformation, enhancement, and/or redaction. In further embodiments, the selective copying further includes selectively copying at least two items of information from at least two discrete source flows to a discrete target flow. In other embodiments, the selective copying further includes selectively copying at least one item of information from a discrete source flow to at least two discrete target flows. In some embodiments, the selective copying is performed automatically and in real-time.

In yet another embodiment, the execution of the instructions further results in the one or more computer performing the step of defining a relationship between the first discrete flow and the second discrete flow. The definition includes a track for listening for new items of information published to the first discrete flow and selectively copying at least one of the new items of information to the second discrete flow.

In a further embodiment, the execution of the instructions further results in the at least one computing device performing the step of defining permissions for an entity. The permissions indicate an ability of the entity to modify parameters associated with at least one flow in the plurality of flows. The parameters may determine whether the at least one flow is discoverable by other flows in the plurality of flows.

The foregoing and other features and advantages of the present invention will be made more apparent from the description, drawings, and claims that follow.

BRIEF DESCRIPTION OF DRAWINGS

The present invention will now be described, by way of example only, with reference to the accompanying Figures, in which:

FIGS. 7 and 8 depict screenshots of a user navigating a web-based front end; and FIGS. 9 and 10 present screenshots of a developer constructing an application utilizing data exposed by another application.

DETAILED DESCRIPTION OF THE INVENTION

Embodiments of the present invention provide methods and devices for information distribution. Standard programming and engineering techniques may be used to produce embodiments including software, firmware, hardware, or any combination thereof to implement the disclosed subject matter. Exemplary embodiments are shown in detail in the accompanying Figures.

Figure 1:
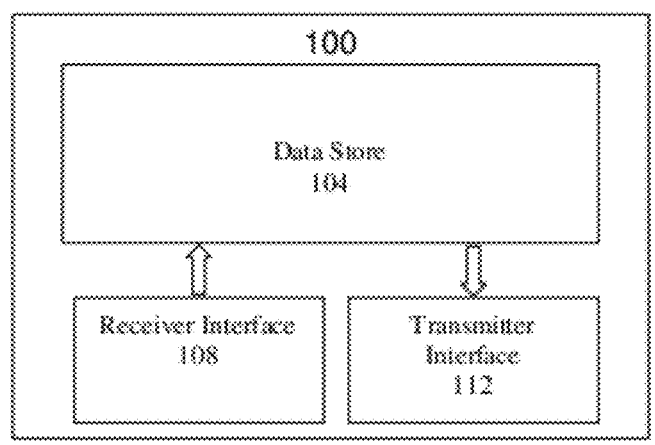
FIG. 1 illustrates an example of a data store in accord with the present invention.

Referring initially to FIG. 1, a block diagram of an apparatus 100 implementing one embodiment of the invention is shown containing a data store 104, a receiver interface 108 and a transmitter interface 112.

The data store 104 may be embodied in a server, a database, a hard drive, an external hard drive or other forms of computer data storage. The data store 104, for example, may also be any volatile memory or nonvolatile memory, or both. A nonvolatile-memory data store 104 may consist of read only memory (ROM), programmable ROM (PROM), electrically programmable ROM (EPROM), electrically, erasable programmable ROM (EEPROM), or flash memory. In the alternate or in addition, a data store 104 may include volatile memory such as random access memory (RAM). RAM may take several forms, including static RAM (SRAM), dynamic RAM (DRAM), synchronous DRAM (SDRAM), double data rate SDRAM (DDR SDRAM), or other advanced forms of RAM known by one of ordinary skill in the art such as enhanced SDRAM (ESDRAM). The data store 104 of the apparatus is intended to comprise, without being limited to, these and any other suitable types of memory. One of ordinary skill would understand that a chosen form of storage for the data store 104, such as a hard drive, need not be used exclusively for the data store 104 but, rather, may contain other data, information, or programs related or unrelated to the operation of the present invention.

At least some of the information in the data store is received by way of receiver interface 108 in the apparatus 100. As further discussed below, the receiver interface 108 may be any device known by one of ordinary skill in the art to have the capability to receive at least one item of information associated with at least one item of meta-information and provide it to the data store. The receiver interface 108 may be any hardware, software, firmware or combination thereof capable of receiving items of information. For example, the receiver interface may comprise a keyboard, touch screen, or other data entry device. Alternatively, the receiver interface 108 may also accept data from a nonvolatile memory device such as a flash memory drive, an external hard drive, or a data connection to a data source. A receiver interface 108 may also be a network interface operating using any implementation of protocols or other features to support communication utilising a network, as described in further detail in connection with FIG. 2.

Just as information in the data store 104 may be received via receiver interface 108, items of information may be provided from the data store 104 via transmitter interface 112. The transmitter interface 112 may be any hardware, software, firmware or combination thereof capable of transmitting items of information including associated meta-information. In one embodiment, the transmitter interface 112 is capable of traversing items of meta-information and providing the associated items of information to a receiver external to the data store 104 using, e.g., technologies such as REST and XMPP.

As will be further discussed in connection with FIG. 3 below, the transmitter interface may operate using any implementation of protocols or other features to support communication utilizing a network. This network may or may not be the same network in communication with the receiver interface 108. The data store 104 may be accessed locally or, as will be later described with reference to FIG. 3, the data store 104 may be accessed remotely.

The data store 104 comprises a plurality of interconnected items of information. Each item of information has any number of required or optional fields. As an example, a sales advertisement for a 1973 Pontiac Firebird may be an item of information in the data store 104. The advertisement may contain the seller's contact information, the price of the car, the condition of the car, and other relevant information. The contents of the items of information are not limited to text or numerical information, but may also include media data such as video data, audio data or executable programs. A data store 104 may contain a plurality of types or categories of information. For example, in one embodiment, the data store 104 may contain every item of information available on the public internet. However, the use of the present invention in certain environments may naturally result in data stores that only contain information limited to certain types or categories. For example, when an embodiment of the present invention is used in a laboratory environment, the data store 104 may only contain information, e.g., about test and lab results. Alternatively, when an embodiment of the present invention is used in a business environment, the data store 104 may only contain, e.g., information about a company's sales, assets, and revenue.

Though such limited use is not required by the present invention, in one embodiment, the apparatus has the capability to associate permissions with one or more items of information entered into the data store. The permission may determine whether the information is viewable by, e.g., the public, by certain groups of people, by invitation-only or by no one except the owner of the item of information. A permission may also restrict whether the information may be received or transmitted from the data store to an external receiver and whether the information is viewable remotely. Permissions may also allow for, e.g., the commercial sale of subscriptions or access to syndicated data feeds.

Embodiments of the present invention may contain multiple data stores, with each data store in the embodiment containing different types or categories of information. Such embodiments containing multiple data stores may be used for a wide variety of reasons beyond categorical separation, including security, speed, or data loss prevention. Further, the data stores, though separate, may operate jointly. An item of information of one data store 104, for example, may be connected with another item of information in another data store 104'. This allows items of information to be separated across multiple data stores but still transparently accessible where needed. For example, a plurality of data stores, each data store associated with a clinical test, may each contain a plurality of items of information, each item of information associated with a single patient in a single clinical test. When the same patient is the subject of multiple clinical tests, and therefore associated with multiple items of information in multiple data stores, the items of information may be interconnected across data stores to allow for the study of clinical test results associated with a particular patient.

Each item of information in the data store 104 is associated with at least one item of meta-information. This meta-information may also be stored in the data store 104. As one of ordinary skill in the art would appreciate, meta-information is information concerning at least one aspect of a particular item of information. By way of example and not for limiting purposes, meta-information may describe the item of information's time and date of creation, the creator of the item of information, the source of the item of information, the means of creation of the item of information, and any standards applicable to the item of information.

In addition, meta-information may simply describe the purpose or category of the item of information. In the preceding example of a Pontiac Firebird for sale, the item of information comprising the advertisement itself may be associated with a plurality of meta-information including "Pontiac," "Firebird," "1973," "car," the contact information of the seller, and "sale." The meta-information may be associated automatically with particular items of information. Embodiments of the data store 104 may have the capability to identify important meta-information associated with each item of information based on the content of the item of information, meta-information associated with similar items of information, predetermined programming, predetermined rules, or any other techniques known by one of ordinary skill in the art to determine the meta-information for an item of information. The item of information may also be manually associated with meta-information. In such an embodiment, when information is added to the data store, then the associated meta-information is also entered.

The interconnected items of information in the data store 104 collectively form an information taxonomy. The root entries in the taxonomy are associated with verbs, such as "Buy," "Find," "Volunteer," "Promote," "Request," and so on. This structure allows for items of information to be grouped, at the highest level, based on action words. The lower level entries in the taxonomy are associated with descriptors or nouns, and these lower level entries are connected to higher level entries in the taxonomy and, optionally, to other lower level entries. As a result, the scope of each item of information associated with the taxonomy is more specific as the taxonomy is traversed from higher to lower levels. In a further embodiment, lower level entries in the taxonomy are associated with nouns and even lower level entries in the taxonomy are associated with adjectives. Further, using action words as root entries allow the users of the system to filter the information in the data store based on what the user is intending to do. This taxonomy allows for large amounts of information to be arbitrarily grouped, manipulated, and traversed in a straightforward and efficient fashion, regardless of how and where the apparatus is used.

Figure 2:
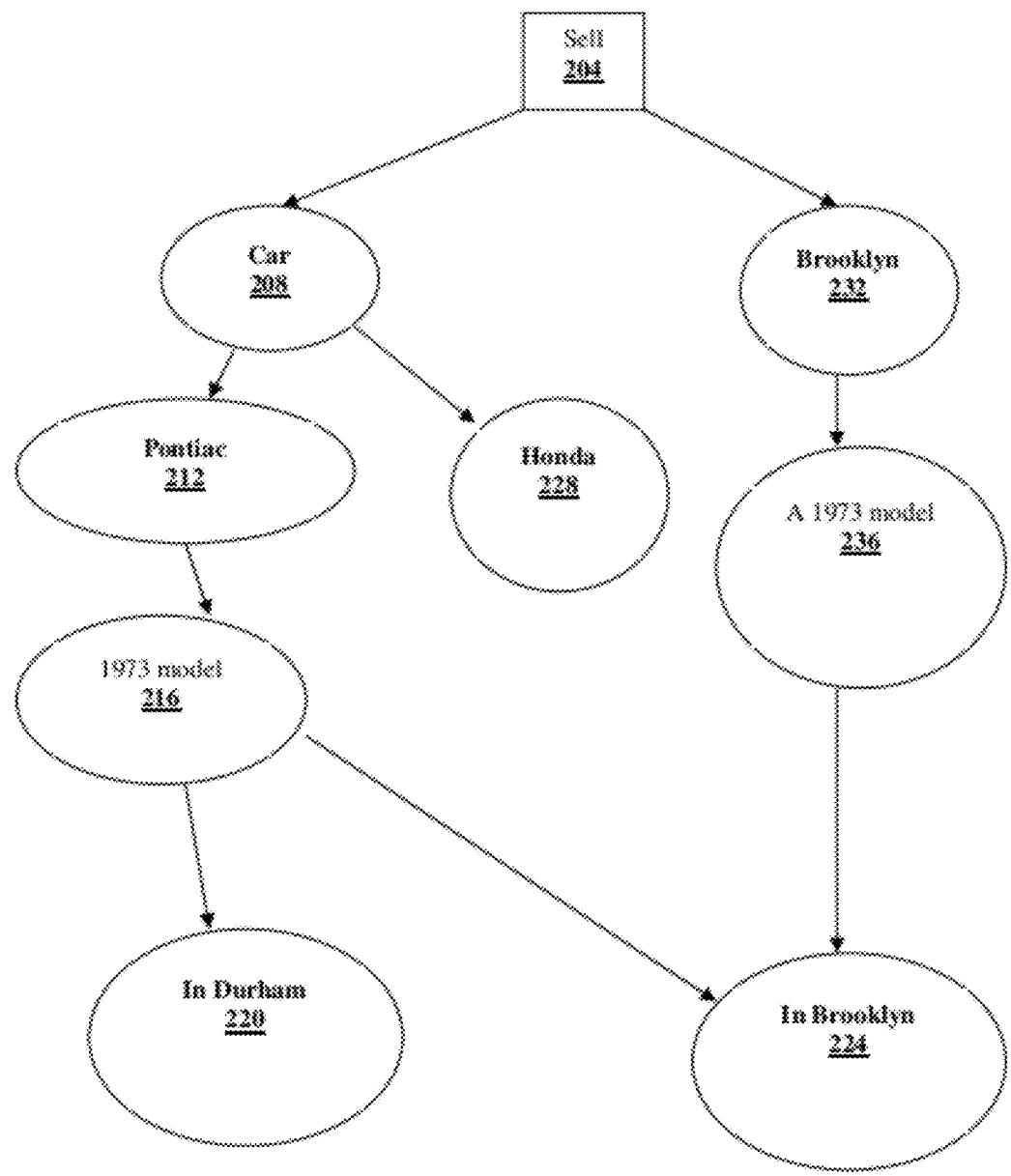
FIG. 2 depicts an exemplary information taxonomy in accord with the present invention.

By way of example, FIG. 2 depicts an exemplary information taxonomy of a data store in accord with the present invention. With reference to the preceding example concerning an advertisement for the sale of the 1973 Pontiac Firebird, when the advertisement and its associated meta-information is received by receiver interface 108, the receiver interface 108 adds the advertisement information to the data store 104 as a new item of information. As a result, the meta-information associated with the advertisement ("Pontiac," "Firebird," "1973," "car," the contact information of the seller, and "sale") is incorporated into the taxonomy of the data store 104. The apparatus may also copy the meta-information from the taxonomy entry already in the data store 104 that is the closest match to the newly-added item of information. In application, an item of information may be associated with several entries in the taxonomy each associated with a word or noun corresponding to the meta-information associated with the item of information. In the Pontiac example, the item of information for the advertisement may be associated with each of the entries 204, 208, 212, 216, 228, 232 and 220. Note that not all possible branches of the trees are shown in FIG. 2. The tree may further contain, e.g., a "Pontiac" or "1973" branch extending from the "Sell" root entry. Embodiments of the present invention allow the administrator of the system to organize or edit the taxonomy in any way he or she would like.

As discussed above, the transmitter interface 112 is capable of traversing the items of meta-information and providing the associated items of information to a receiver external to the data store. In one embodiment, when the data store receives an item of information, it further processes the item of information to identify an interconnected item of information and provide the interconnected item of information to a receiver external to the data store. Similarly, the apparatus may also contain a syndication mechanism for receiving information and meta-information from the receiver interface and subsequently providing the received information and meta-information to at least one external receiver utilizing the transmitter interface. These mechanisms may be implemented through software, firmware, hardware, or any other combination thereof. In one embodiment, this syndication device may syndicate only certain items of information based on predetermined rules. The syndication device may also syndicate a particular item that has been requested by the external receiver. Thus, with reference to FIG. 2, where an external receiver would like to receive all advertisements for a 1973 Pontiac Firebird that is on sale in Brooklyn, the transmitter interface will traverse the tree starting at the "Sell" root-entry and continue through the information taxonomy until all keywords have been met—that is, "1973," "Pontiac," "Firebird," and "Brooklyn." In traversing the information taxonomy in this manner, the transmitter interface 112 ends at information taxonomy entry 224 in FIG. 2, having found an entry that is associated with all of the keywords. The transmitter interface 112 then transmits all items of information that are associated with this entry, which includes all advertisements for a 1973 Pontiac Firebird in Brooklyn, to an external receiver. Because the advertisement information is also associated with entries in the higher levels of the taxonomy, the advertisement information would also be sent to an external receiver if information associated with entries 204, 208, 212, 216, 228, or 232 were to be transmitted. As seen in FIG. 2, the structure of the taxonomy entries allows the transmitter to traverse the taxonomy in different paths and still find the desired items of information. Rather than begin the traversing with the keywords "Sell," and then "car" (i.e., traversing from node 204 to node 208), it is possible to find the same items of information by beginning with the keywords "Sell," and then "Brooklyn."

The apparatus of the present invention may further contain a republisher that copies at least part of a first item of information in the data store to a second item of information in the data store based on a predefined rule. This copying may occur automatically upon the addition of the first item of information to the data store. Further, the item of information may be transformed in the process. The items of information may be transformed structurally, for example. Taking the Pontiac advertisement as an example, rather than copy the complete advertisement, the apparatus may simply take the pertinent information such as the price, model, and contact information from the first item of information and copy it to a new item of information associated with another entry in the taxonomy. This allows for the syndication of content by the defining of rules that take received items of information and copy them to a new item of information associated with a transmitter interface 112 for rebroadcast to users or applications subscribed to that new item of information.

The apparatus may further transform such information into a table for easier viewing. Furthermore, multiple car advertisements may be transformed into a table and combined for easier viewing and comparison. In addition, rather than a text file, the information may be placed in a spreadsheet. As seen in this example, some information may simply be redacted or not copied. This is especially beneficial where there is a large amount of information subject to the defined republication rule.

A rule may be triggered, for example, based on the receipt of an item of information from a particular source, upon the receipt of an item of information with a particular destination, or upon the receipt of an item of information with a particular characteristic such as a category of information, a specific keyword or a certain time or date. A rule may be defined by a user or by an administrator of the system. This republisher mechanism allows items of information to be further added to other items of information that are associated with other entries in the taxonomy based simply on a defined rule. The advantage of this operation will become further apparent in the discussion of FIG. 3

Figure 3:
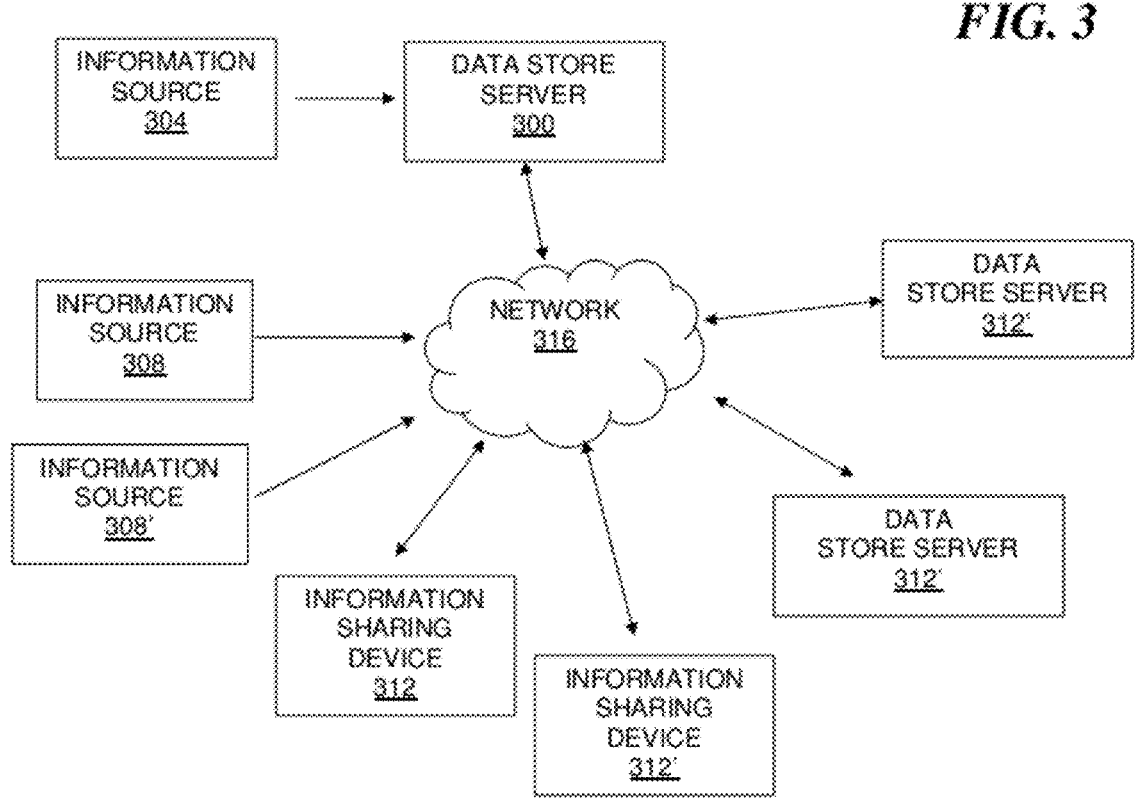
FIG. 3 illustrates an interconnected network of information sources, data store servers in accord with the present invention, and information sharing devices.

Referring now to FIG. 3, there is shown an embodiment of a data store server 300 that is connected a network 316 containing a plurality of connected information sources 308, 308', information sharing devices 312, 312' and additional data store servers 312, 312'. A data store server 300 may comprise a data store 104, a receiver interface 108 and a transmitter interface 112 as shown in FIG. 1. As discussed above, the receiver interface 108 and transmitter interface 112 may be connected to the network 316 via a network interface.

The connection to the network 316 allows the items in the information store to be transmitted to and received from the other devices on the network 316. Items of information may also be received locally from a local information source 304. The local information source 304 may be an embodiment of the present invention that is connected to the data store server 300 via a data connection separate from the network 316. The data connection may be any connection known to one of ordinary skill in the art that allows information to be transmitted to and from the data store server 300.

Network 316 may be any network or collection of networks that carries data communications including communications from and to network capable devices. Network 316 may comprise, for example, a local area network, a wide area network, or a combination thereof. The network 316 may carry communications from wired and wireless data devices, and may support a wide range of protocols and technologies, including those of the World-Wide Web. Embodiments of the present invention may additionally operate as a multi-protocol gateway among a plurality of messaging systems, thereby providing a single interface to several different kinds of information sources accessible by various, differing protocols. Thus, the devices shown in FIG. 3 may be able to communicate with each other on network 316 even where the devices' network protocol systems differ.

Network 316 connects a plurality of connected information sources 308, 308', information sharing devices 312, 312' and additional data store servers 312, 312'. As such, the data store server 300 may communicate with any number of devices connected to network 316 and vice versa. As a result, any number of devices connected to network 316 may communicate with any other number of devices also connected to network 316. Information sources 308, 308' may transmit items of information to any one of data store 300, 312, 312' that is connected to network 316. Unlike the other types of devices on network 316, information sources 208, 208' operate to provide information to data stores 300, 312, 312'. As such, the sources 308, 308' typically do not contain a data store 104 or receiver interface 108 of their own. An information source 308 may be, for example, an automated weather station that transmits temperature information. Another information source 308 may be, e.g., a source of stock market price data.

In contrast to information sources 308, information sharing devices 312, 312' may comprise their own data store 104, receiver interface 108, and transmitter interface 112. These devices 312 may keep a smaller amount of information in its data store, relative to dedicated data store servers 300. Using the receiver interface 108, devices 312 may receive items of information from other devices 312' via those devices' syndication mechanisms or transmitter interfaces 112. Using its transmitter interface 112, a device 312 may also be able to syndicate its own information to other devices 312 on the network 316. Further, using permissions, a device 312 may broadcast the availability of information in its data store 104 to other devices on the network 316.

Because the information sharing device 312 may be an embodiment of the present invention, it may have a viewing screen and a keyboard as a receiver interface. The sharing devices 312, 312' may be used to view items of information stored at data store server 300, 312, 312'. A device 312, for example, may search and view any item of information at data store server 300 based on an implicit or explicit query defined by the user of information sharing device 312, such as a request for information concerning an offer to sell a 1973 Pontiac Firebird. A device 312 may continue to receive additional related items of information on a push or pull basis by defining queries for a republisher mechanism to associate with the device 312. The sharing devices 312, 312' may also interact with the data store server 300, 312, 312' to retrieve a particular item of information via the device's 312 receiver interface for display at the sharing device 312. The user of the information sharing device 312 may be notified upon the receipt of a new item of information.

Figure 4:
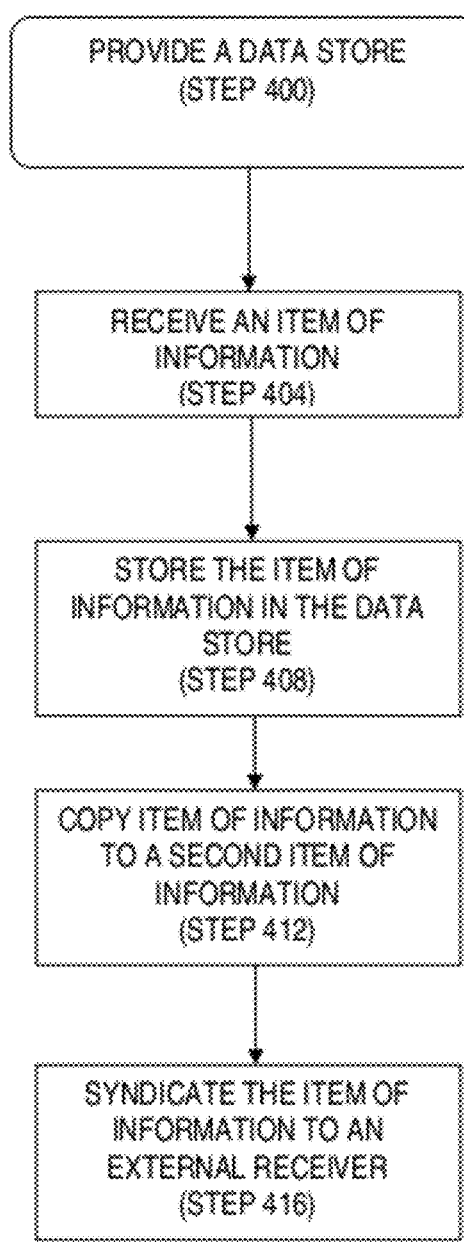
FIG. 4 presents an embodiment of a method for organizing information in accord with the present invention.

Referring now to FIG. 4, a flowchart of one embodiment of a method for information organization and exchange is shown. In this method, a data store is provided (step 400). The provided data store comprises a plurality of interconnected items of information. Items of information may be text, data, video, audio, and even executable programs. Each item of information in the data store may optionally be associated with at least one permission, which may determine whether the item of information is available publicly, is available by invite-only, or is private. The data store may contain a wide range of information or may be particularly focused on a particular category or type of information. For example, one data store may contain the information available on the World Wide Web, while another data store may simply contain a user's homework, class schedule, and interests. Thus, in various embodiments, multiple data stores may be provided. Each data store, though separate, may operate with one another. An item of information in one data store, for example, may be interconnected with another item of information in a different data store. This allows items of information to be both categorically or securely separated, but still shared where appropriate. It also allows information between data stores to be shared and replicated.

Further, each item of information in a data store is associated with at least one item of meta-information. This meta-information may also be stored in the data store. The meta-information may describe the item of information in the data store such as its time and date of creation, the creator or author of the item of information, the source of the item of the information, the means of creation of the item of information, or any standards applicable to the item of information. In addition, meta-information may also describe the purpose or category of the item of information. The meta-information may be associated with the items of information automatically upon the entry of the item of information into the data store. For example, the data store may have the capability to identify important meta-information associated with each item of information based on the content of the item of information, the meta-information associated with similar items of information, predetermined programming, predetermined rules, or any other techniques known by one of ordinary skill in the art to determine the meta-information associated with an item of information. In addition, the item of information may also be manually associated with meta-information.

The interconnected items of information in the provided data store collectively form an information taxonomy where the root entries in the taxonomy are associated with verbs while the lower level entries in the taxonomy are associated with descriptors or nouns. These lower level entries are connected to higher level entries in the taxonomy and, optionally, to other lower level entries. In some embodiments, the lower level entries in the taxonomy are associated with nouns while even lower level of entries in the taxonomy is associated with descriptors.

With reference again to FIG. 4, an item of information is received that is associated with at least one item of meta information (step 404) after the data store is provided (step 400). The item of information is then stored in the data store (store 408). When this occurs, the information taxonomy at the data store is updated such that the meta-information associated with the added item of information is incorporated into the data store 104's taxonomy. Associations between existing entries in the taxonomy may be updated based on the newly added item of information. The added item of information may also be copied to preexisting entries in the taxonomy corresponding to its associated meta-information.

When an item of information is added to the data store (step 408), a plurality of actions may take place. For example, the item of information may be processed to identify an associated item of information and the associated item may then provided to a receiver external to the data store. In another embodiment, after an item of information is added to the data store (step 408), the received information and associated meta-information are syndicated to an external receiver. In the embodiment shown in FIG. 4, after an item of information is stored in the data store, at least part of the item of information may also be copied to a second item of information based on a predefined rule (step 412). This step may occur automatically upon the addition of the item of information to the data store (step 408). This step of copying may also transform the items of information in the process of copying. This change of information may include changing the format, the content, or the structure of the item of information.

For example, in copying a first item of information to a second item of information, a text file may be changed to a spreadsheet file. Further, some information that was originally in the item of information may be deleted. Alternatively, additional information from a second source may be incorporated into the copied item of information. Finally, the structure of the item of information may change. For example, a newspaper article may be changed to be in outline form or a car sales advertisement may be changed to be a table listing the price, model, and contact information. The ability to transform information is especially beneficial where there is a large amount of information in a particular item.

The predetermined rule may be triggered based on the receipt of an item of information from a particular source, upon the receipt of an item of information with a particular destination, or upon the receipt of an item of information with a particular characteristic. Examples of particular characteristics may include a category of information, a specific keyword or a certain time and/or date. In addition, the rule may be defined by the users or the administrator of the system and may be entered at the apparatus or remotely.

In some embodiments, users and applications (e.g., mobile applications, web applications, desktop applications, and the like), are able to simultaneously publish and subscribe to granular pools of real-time content, or "flows." Flows include content units, or "drops," which move and/or are copied among flows, and may contain comments, ratings, references to other flows, and any number of required or optional fields. Content drops can be created, bought, sold, shared, curated, and contributed to flows by users, applications, and other entities. In some instances, when adding content to an existing flow, users or applications may add reference flows, new fields, metadata, and other information to the added content drops.

Individuals, application developers, communities, and other entities may create individual flows, and define the data structures, including the required and optional fields, for content drops that are contained by the flows. Flow creators can define any number of discrete fields on an ad hoc basis. In some instances, the fields have value, type, format or other requirements (e.g., a date field requires a date, a location field requires a location).

Flows may optionally fall into any number of categories. For example, flows may be classified as one or more of Application Flows, Identity Flows, System Flows, and Reference Flows. Application Flows are flows that are created and owned by an application (e.g., software running on a mobile, web-based, or other suitable platform). Identity Flows are those flows created and/or owned by users, or "identities." A user/identity can be a person, group of people, company, organization, other type of entity, or any combination of the foregoing. System Flows are flows that are structured and curated by a community of users, or by various groups or combinations of users, applications, and/or other entities. Finally, Reference Flows are flows with reference or other relatively static information (e.g., a historical listing of car makes and models).

In defining a flow, the creator (or other permitted user) defines the entities that are permitted (or forbidden) to publish and/or subscribe to the flow. Flows may be entirely public (discoverable by developers, consumers, applications, and other entities), or private (invite-only). In some instances, access to a flow may be limited to one or more groups of users, applications, organizations, or other types of groups. For example, subscription to a flow may be limited to users of a particular website. In another example, publication to a flow may be restricted to applications that create classified ads.

Content drops can enter a flow (i.e., be published into a flow) through a variety of mechanisms. For example, content may be published into a flow from any number of other flows (via tracks, as discussed below). In other cases, content may be manually added to a flow via, e.g., a blog post, status update, microblog post, tweet, ad posting, auction posting, and the like. Further, applications external to the system may source content and publish it to a flow; for example, a consumer market survey application may subscribe to individual user flows, and publish surveys back to those users when it detects signs of interest in a particular product.

Flow permissions may define who can (whitelisting) or cannot (blacklisting) change the flow definition, fields, permissions, or tracks, or add content, delete content, see the flow, discover the flow, and modify various other attributes associated with the flow. Flow permissions may also define how tracks (discussed below) may interact with the flow. For example, an authorized user may indicate whether a flow can be discovered by other flows; that is, whether other flows can locate that flow and send content drops to it through a track. Likewise, permissions may be set indicating whether a flow is permitted to discover other flows.

In some embodiments, permissions may define which content drops, or which portions of content drops, that a user may see, access, or retrieve from a particular flow. For example, a subscription-based classified ad application may publish content drops concerning cars for sale to an Application Flow. Each content drop may contain fields such as car make, model, seller contact information, and so on. User A, a non-subscriber, may have an Identity Flow that receives content drops from the Application Flow. However, because User A does not pay for a subscription to the classified ad application, he is permitted only to receive basic content drops containing only, for example, the make, model and year of each car for sale. On the other hand, User B, having the permissions of a subscriber, will receive a richer stream of content drops to her Identity Flow, including the ability to receive all or most of the ad fields in the drops.

Content drops may be moved, copied, forwarded, routed, or otherwise transmitted among flows using configurable, versatile pathways, denominated herein as "tracks." If content drops are transmitted from Flow A to Flow B via a connecting track, then Flow A "tracks to" Flow B, and Flow B "tracks from" Flow A. A population of flows connected with tracks may be envisioned as a "flow graph," in which the flows are nodes, or endpoints, and the tracks are edges connecting the nodes. Tracks are able to perform a variety of user-specified functions on content drops, such as transforming, filtering, redacting, modifying, enhancing, and joining content with information from other flows. In addition, tracks may perform any combination of these or other functions, including none of them. A track may perform operations on content drops based on sets of rules, which may be hierarchical. For example, a track may perform a function based on the presence of a particular field in a drop, and may perform further operations based on the information present in that field.

In some embodiments, tracks perform such functions on the content drops automatically and in real-time. In other words, in some embodiments, once flows are constructed and the necessary parameters associated with the tracks and flows are determined, no user intervention is required for content drops to be transferred among flows. Tracks may "listen" to any number of source flows, pull content drops from the source flows, and/or push the drops to one or more target flows, according to configurable rules associated with the source flows, target flows, tracks, or any combination thereof. The transmission of information from a first flow to a second flow may occur in real-time, using, for example, XMPP or other suitable messaging technology. The second flow need not poll or query the first flow; that is, Representational State Transfer (REST) architecture or other API query is not necessary.

Tracks may connect any number of flows, unidirectionally or bidirectionally, and are able to route, move, copy, or otherwise transmit content drops among flows based on the information content of the drops. No source or destination routing information is required for content drops to be transmitted among flows (although such information may exist in the flows for other purposes). In some embodiments, tracks may pull all content drops from connected source flows, and determine where to route the drops based on the information in the drops. In other embodiments, tracks may determine which content drops to pull from source flows based on the information in the drops. For example, a user may set up a track from a food-related System Flow to that user's Identity Flow, such that all content drops regarding local farmers' markets are relayed to the Identity Flow. When a relevant content drop is published to the System Flow, the track (which is listening to the System Flow, continuously or at a fixed or random interval) automatically and dynamically determines that the drop should be transmitted to the user's Identity Flow. The track may make this determination based on the presence of certain keywords, fields, values in the fields, language analytics, the source of the content drop, rules defined by the user, or any other suitable method.

Figure 5:
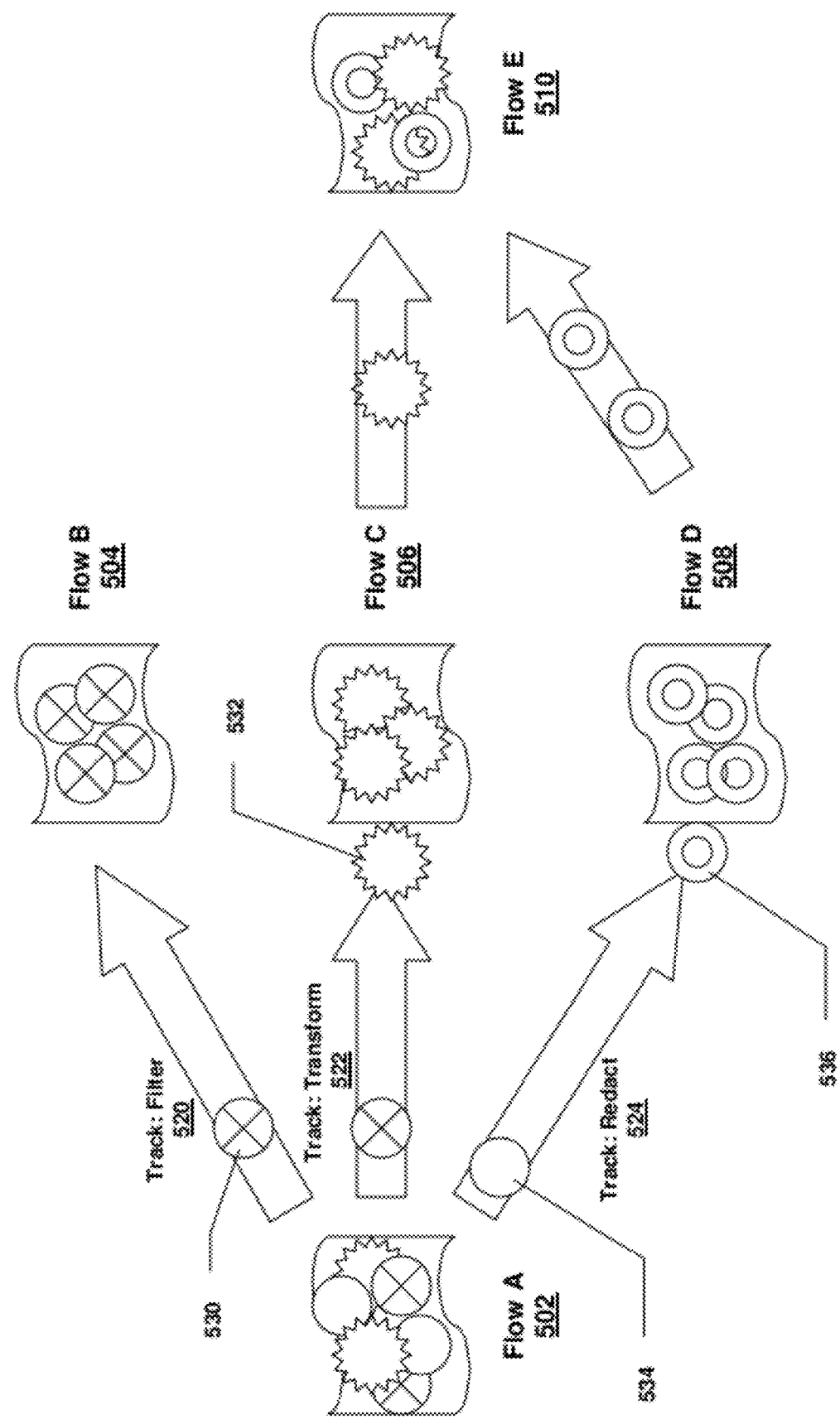
FIG. 5 illustrates by example a flow and track diagram in accord with the present invention.

FIG. 5 depicts one embodiment where various content drops are transferred among flows via tracks. Although only a limited number of content types, flows, and tracks are illustrated, it should be appreciated that the invention may support hundreds, thousands, or even millions of different flows, tracks, and individual content units. In FIG. 5, Flow A 502 contains three types of content drops. One type of drop may be, for example, political news stories, while another type may be car sale advertisements. The individual content drops of a particular type, although appearing identical in FIG. 5, typically represent different content. For instance, if the sun-shaped content drops represent car sale advertisements, one of the drops may contain data regarding an ad for a 1989 Ford Thunderbird, while another may contain data for an ad selling a 2005 Honda Accord.

Three tracks extend from Flow A 502, and the various content drops are transferred to Flow B 504, Flow C 506, and Flow D 508 by the tracks. Track 520 performs filtering on content drops from Flow A 502. As illustrated in FIG. 5, Track 520 copies a particular type of content drop 530 to Flow B 504, such that Flow B 504 contains only content of the same type as drop 530. In some embodiments, Track 520 may filter more than one type of content drop, or may filter individual content drops within a particular type of content. The filter criteria may include any suitable criteria for filtering information, and may be based on keyword, content type, metadata, time, size, interest, permissions, or any other discrete criterion or combination thereof, including no filter at all (i.e., the track copies all drops), Track 520 may filter drops based on parameters specifying what content Flow B 504 can receive, what content Flow A 502 can source, or both. More generally, the operations performed by a track may be affected by the configuration of the source flow(s), target flow(s), and/or the track itself.

Track 522 performs a transform operation on content drops from Flow A 502. Referring still to FIG. 5, Track 522 transforms the drops from Flow A 502 to conform with the structure of content drop 532. Transforming may include, for example, parsing various fields of data and populating a structure that is more readily usable by destination Flow C 506. If, for instance, Track 522 were configured to pull advertisements for upcoming events from Flow A 502, and the ads were in various formats, Track 522 would transform information of interest (e.g., time, date, place) from each drop into a new drop prior to forwarding it to Flow C 506. Flow C 506 would then be able to make use of the content as received in an expected, structured format.

Another operation that a track may perform is redaction, wherein a portion or all of a content drop is revised or removed. Track 524 exemplifies a track that is configured to pull a content drop 534 from Flow A 502, redact a portion, and forward the redacted drop 536 to destination Flow D 508. Track 524 may redact all content drops that pass through it, or may be configured only to redact information in certain drops. In other embodiments, Track 524 may examine all drops for particular information (e.g., personally identifiable information, such as social security numbers), and redact the information regardless of the content drop it appears in.

Tracks may also add to content drops. For example, a track may add various metadata to content drops, such as adding information describing the source of the content. In some embodiments, tracks may join content from any number of flows. Referring back to the example of car sale ads, a track may obtain from a reference data source (flow) information about the title history of a vehicle based on a VIN identifier present in the content drop. The title history data can be merged or joined with an existing content drop containing a car ad in order to form an enhanced drop regarding the car sale.

Flows and tracks may exist in a one-to-one relationship (e.g., the single track between Flow C 506 and Flow E 510), in a one-to-many relationship (e.g., tracks 520, 522, 524 between Flow A 502 and Flows B 504, C 506, and D 508), and in a many-to-one relationship (e.g., the two tracks between Flows C 506 and D 508, and Flow E 510). Paths among flows may also exist in loops; for example, in some embodiments, a track may exist from Flow E 510 back to Flow A 502 (not shown). Further, in some instances, flows may be unidirectional or bidirectional.

Tracks may connect various types of flows, including, but not limited to, Application, System, Identity, and Reference Flows. An Application Flow may be connected to any other type of flow described herein, including another Application Flow. For example, two applications may desire to share their data with each other. An Application-Flow-to-Application-Flow track facilitates this behavior by allowing one or more receiving applications to track content drops published by a source application. An Application-Flow-to-System-Flow track permits an application's content drops to be published into public system flows. For example, a coffee rating application that allows users to collect and share coffee ratings could have any non-private ratings, comments, and other information automatically forwarded to publicly shared flows. Application Flows may also track to Identity Flows; for example, if a user publishes restaurant reviews on an individual Identity Flow, a coupon application may forward a content drop containing coupons for nearby restaurants to that user. In some cases, an Application Flow may track to a Reference Flow; e.g., the coffee rating application described above may allow users to edit reference information about coffee venues, and such updates would be published to the appropriate Reference Flow.

Generally, System Flows can also track to other types of flows, although typically system flows do not track to Reference Flows, nor do System Flows track to or from each other. In the case in which a System Flow tracks to an Application Flow, content drops are sourced from, e.g., community-curated content in the System Flow and copied to flows subscribed to by applications that may desire to use the content in its original or an enhanced format. For example, a coupon application may track various restaurant, bar, gym, and other deals appearing in various System Flows, such that any new deals are received and republished to the application's flow in real-time as the deals are published. System Flows may also track to Identity Flows. For example, a car aficionado may want to receive information in real-time about Pontiac Firebirds. He may set up tracks from the System Flow to feed one of his user flows every time a content drop enters the system concerning Firebirds for sale, photos of Firebirds, blogs about Firebird restoration, and the like.

Identity Flows are flexible and can track to the various types of flows described herein. For instance, an individual can set the appropriate permissions such that an application is able to receive content from an Identity Flow (i.e., a track from an Identity Flow to an Application Flow). In one example, a user may grant a coffee coupon application access to the user's coffee rating flow, which the application will then track to its own application flow. In the case of Identity-Flow-to-System-Flow tracks, an Identity Flow publishes content drops, and the track adds, e.g., required or optional metadata before republishing the drops to a System Flow. For example, a consumer, Alice, may integrate her blog's RSS feed with the invention (in other words, she may "dropify" her feed) such that her blog posts are automatically published to a particular publicly-shared flow to be discovered by others. In other instances, Identity Flows may track to other Identity Flows; e.g., Alice may create a track from the flow of another user, Bob, such that technology stories that are published into Bob's own Identity Flow are copied to Alice's flow. In some embodiments, Identity Flows do not track to Reference Flows, although the former may be permitted to update the latter.

Reference Flows may also track to certain types of flows, although they typically do not track to System or other Reference flows. With a Reference-Flow-to-Application-Flow track, for example, updates to information content in reference flows, such as updates made to the locations of coffee venues, may be copied to a flow provided by an application. Likewise, an Identity Flow can track from a Reference Flow; for instance, a reviewer could monitor additions and amendments made to a wiki, and review/edit the changes prior to republishing them as a flow for applications interested in a reviewed version of that Reference Flow.

Figure 6:
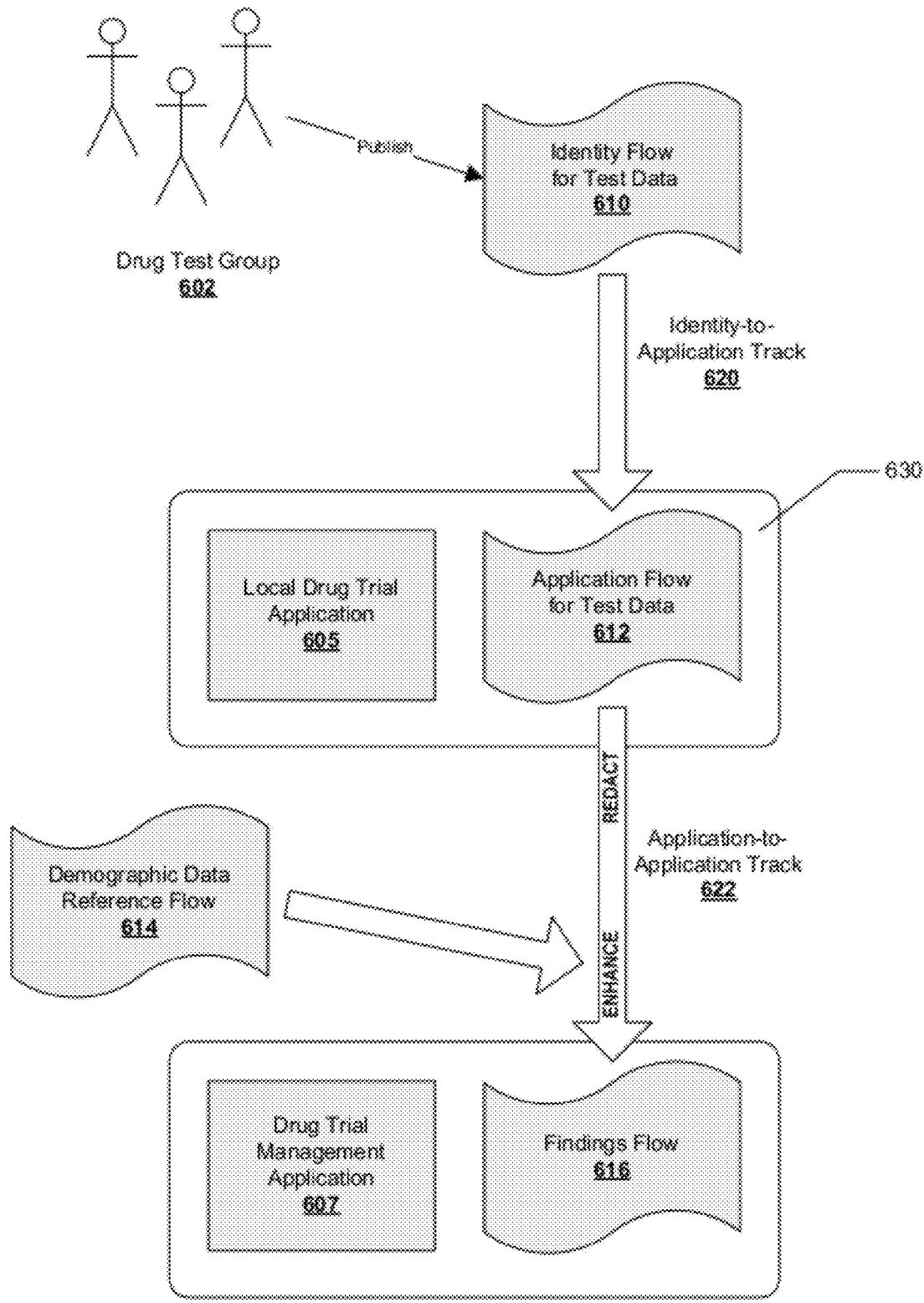
FIG. 6 illustrates by example a use case diagram in accord with the present invention.

FIG. 6 illustrates an exemplary complex use case involving various aspects of the invention, including multiple types of flows, tracks, and track behaviors. In the example, a local drug trial builds a flow-powered application 605 to interact with and monitor conditions in test group 602. During the trial, participants in the test group 602 are asked to log their dosages, times of dosage, symptoms, and other comments. This data is initially published to a flow that the identity (i.e., the drug test group 602) owns and is permissioned to be shared with the trial application 605. The trial application 605 has associated with it an application flow for test data 612 in its private application space 630. The application test data flow 612 receives test data from the identity test data flow 610 via an identity-to-application track 620. This track 620 may copy all test data through, or may filter the data for copying based on various keywords, patients, or other desired criteria.

The local drug trial application 605 monitors its application test data flow 612 for specific conditions or symptoms of note, and publishes the notable data, in drop form, to the findings flow 616 of another application that manages many local trials for a large drug company 607. The data is published to the flow 616 through an application-to-application track 622 that performs a number of operations on the data before making it available to the application through the flow 616. First, the track 622 redacts personally identifiable information to create anonymized content drops. Then, the anonymized drops which may include, e.g., a patient's zip code, are enhanced by demographic information related to that zip code, which is pulled in from a reference flow 614. The managing drug company may then analyze the content in the findings flow 616 and potentially share results with other drug companies through a shared content space.

In certain embodiments, users may interact with a data store in accord with the present invention utilizing a web-based front end. The front end allows users to define rules that create a syndicated feed from the interconnected items of information in the data store that can be updated in real-time as new items are added to the data store that satisfy the rules. The web-based front end can also be used to associate a unique URL with each syndicated feed. A web-based front end can also be used to add items of information to a data store, optionally restricting access to the data store using permissions, as discussed above. These new items of information can utilize the data fields in existing items of information or they can utilize additional data fields. The web-based front end can provide these services without charge or with charge, on a per-feed/per-application basis. A web-based front end can also include portal functionality, providing links or access to third-party applications that interoperate with the data store as described above.

In further embodiments, the web-based front end may allow users to create and define flows and flow permissions, as well as tracks and the conditions/actions associated with the tracks, such as when and how to filter, transform, or take other actions with respect to content drops being transferred among flows.

Figure 7:
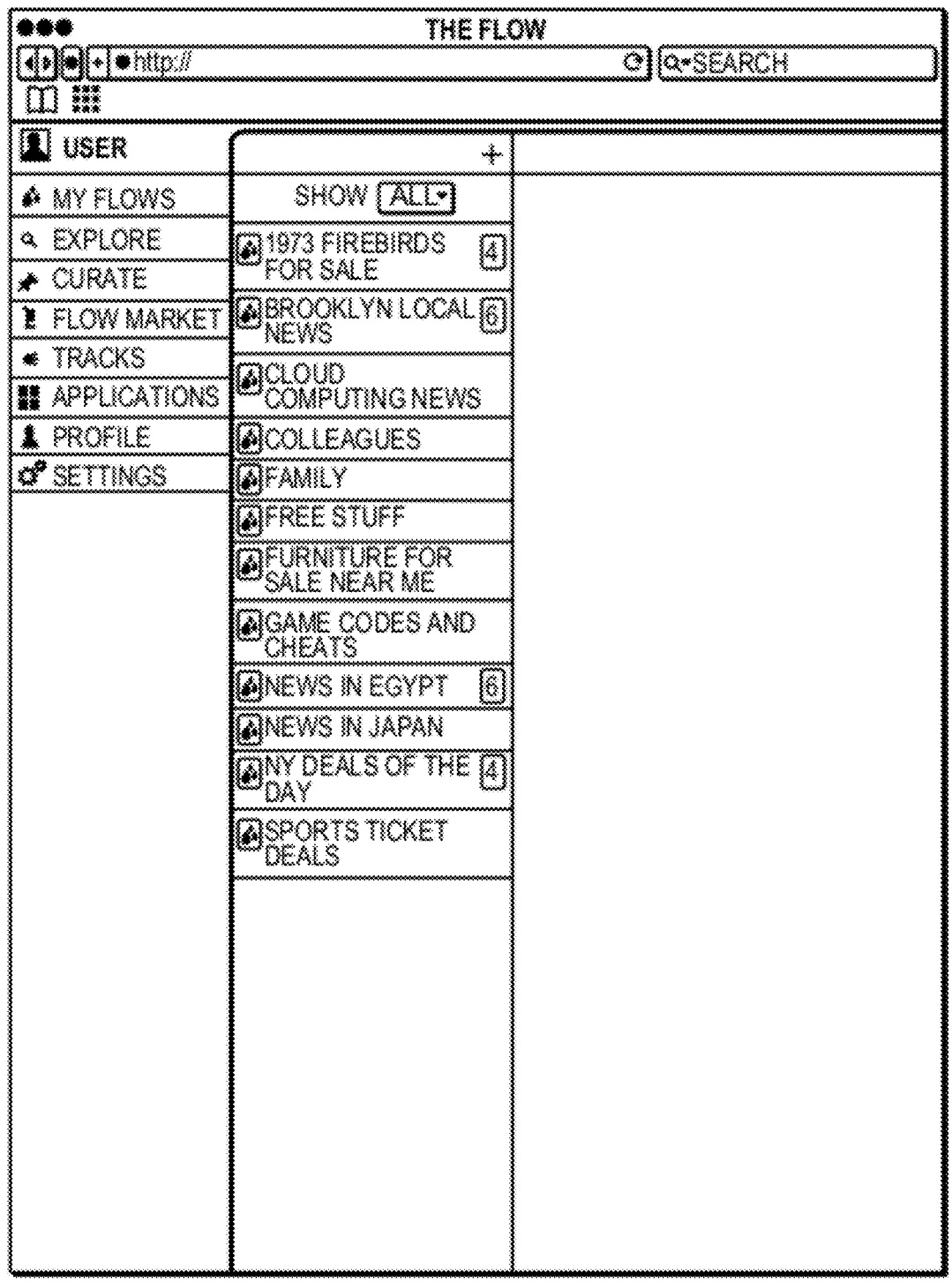
Figure 8:
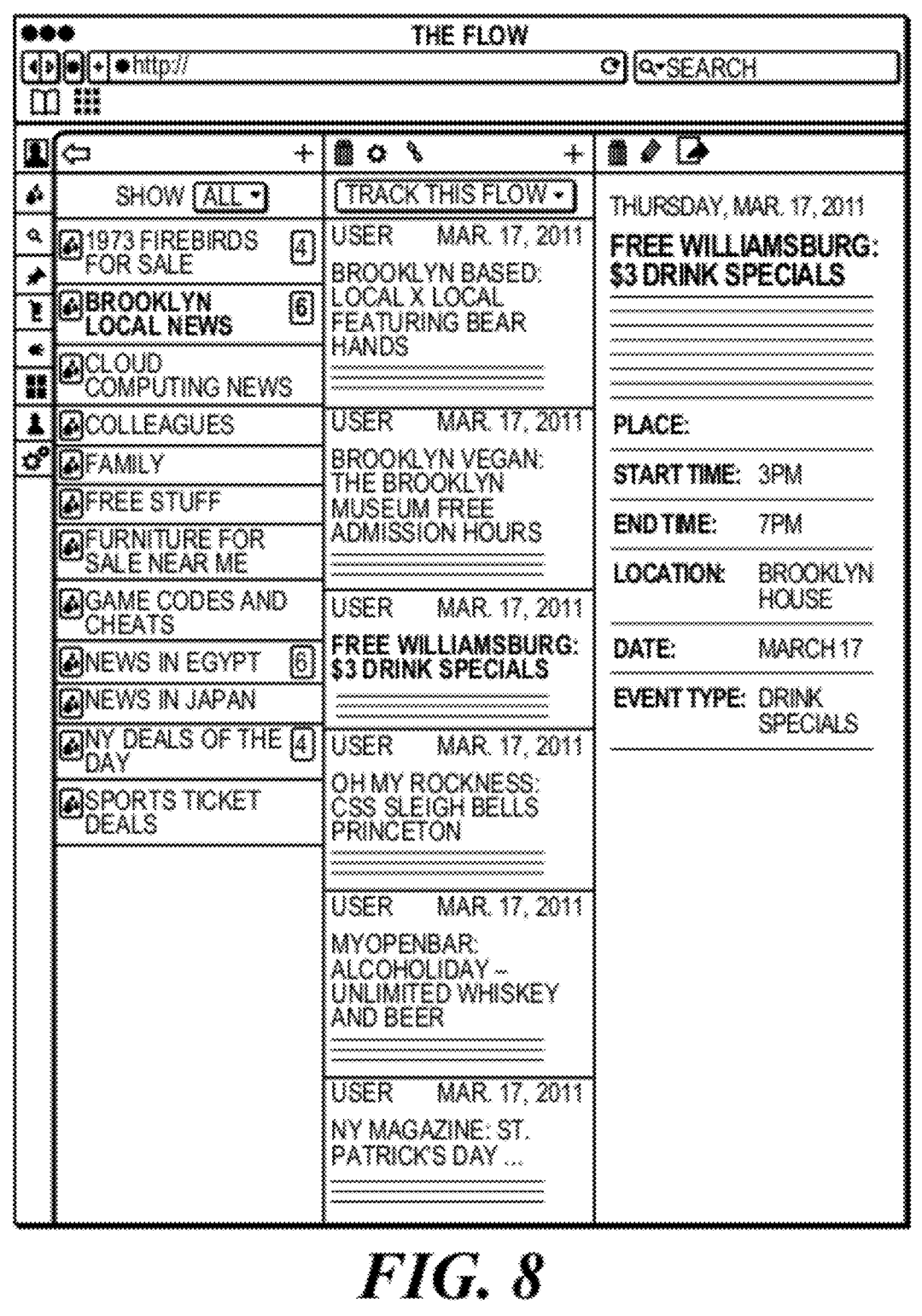

FIGS. 7 and 8 depict screenshots of a user navigating a web-based front end. FIG. 7 shows a user accessing their personal set of syndicated feeds. FIG. 8 shows all of the items of information associated with a particular syndicated feed (i.e., "Brooklyn Local Events"), as the contents of a particular item of information having previously defined fields (i.e., "Start Time", "End Time", etc.).

In another embodiment, application developers can discover other applications that are using the same or similar syndicated data feeds. If an application developer exposes his data structures, other developers can leverage that application's data while adding additional application functionality. For example, an application that offers restaurant coupons can utilize an application that rates restaurants by offering end-users a relevant coupon every time they rate a restaurant. Another application may come along and offer restaurants a way to track coupon usage, leveraging data from the second application.

Figure 9:
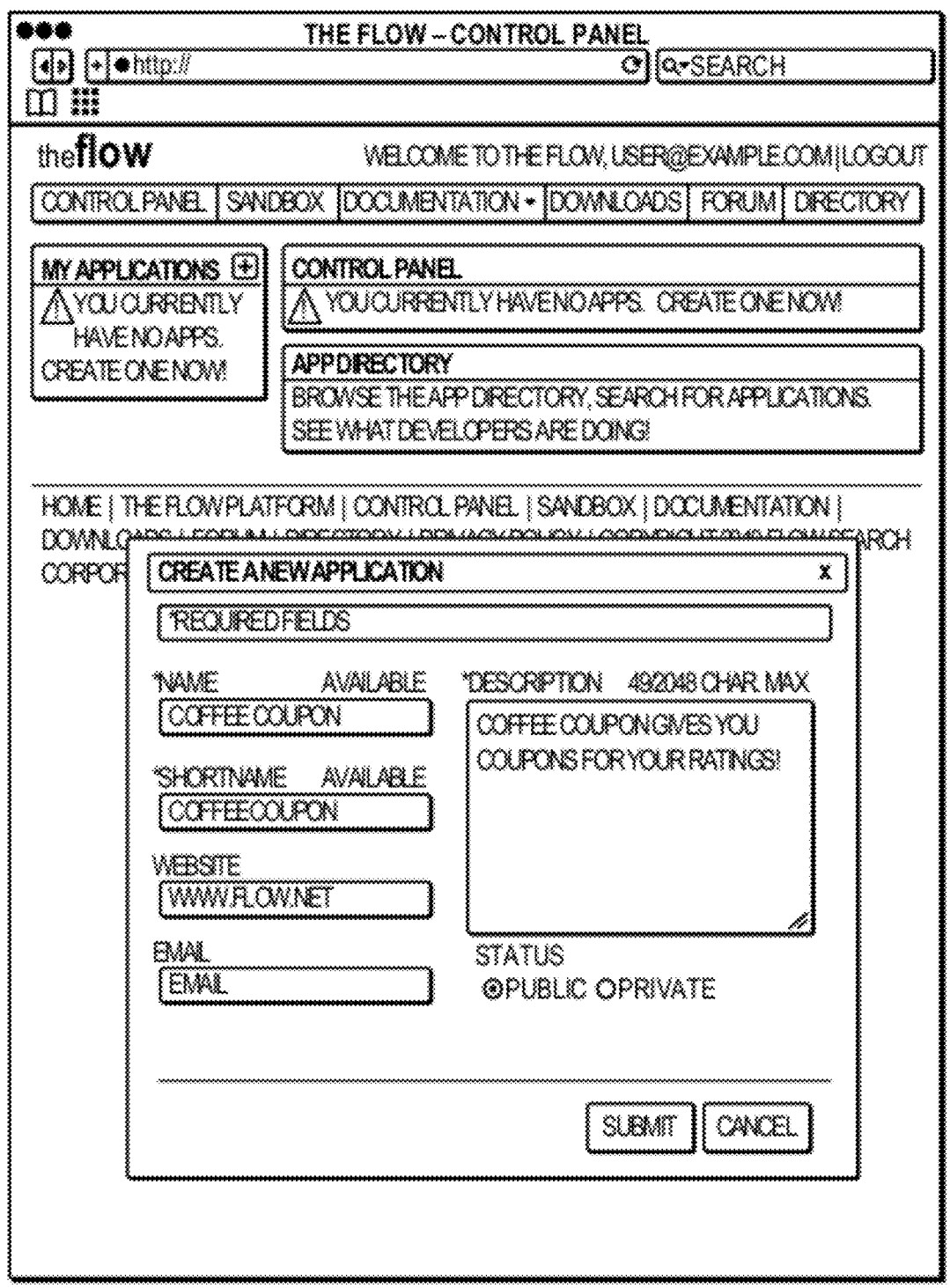

FIGS. 9 and 10 illustrate a developer constructing an application utilizing data exposed by another application. FIG. 9 shows a developer assembling an application that will distribute coupons to end users for coffee purchases. FIG. 10 shows the developer incorporating several publicly-accessible syndicated feeds (i.e., "Coffee Ratings", etc.).

It will therefore be seen that the foregoing represents a highly advantageous approach for information organization and exchange. The terms and expressions employed herein are used as terms of description and not of limitation and there is no intention, in the use of such terms and expressions, of excluding any equivalents of the features shown and described or portions thereof, but it is recognized that various modifications are possible within the scope of the invention claimed.

What is claimed is:

1. A computing device for information exchange and routing, the device comprising:
   a memory for storing computer-executable instructions;
   a processing unit for executing the computer-executable instructions stored in the memory; and
   a user interface for receiving commands from a user of the computing device,
   wherein the execution of the computer-executable instructions results in an application selectively providing items of information to third parties, the items of information being organized in discrete flows, each discrete flow comprising a pool of real-time content containing the items of information, each discrete flow having a defined data structure for items of information contained by the discrete flow, each defined data structure comprising a plurality of fields, each field requiring a particular type of content to be held in the field, with each individual item of information having at least one field of data, wherein the discrete flows comprise nodes in a graph and wherein a plurality of tracks comprise edges connecting discrete flows in the graph, wherein a particular track comprises a configurable pathway among a subplurality of the discrete flows that performs one or more operations on items of information being transmitted among the subplurality of discrete flows;
   wherein the execution of the computer-executable instructions further results in the definition of a track among a plurality of flows such that at least one original item of information in at least a first discrete flow is selectively copied to at least a second discrete flow, wherein the selective copying does not require that the first discrete flow or the selectively copied item have knowledge of the second discrete flow, and wherein the track, in copying the item of information, performs in real time at least one field-level operation on the at least one selectively copied item of information resulting in the addition, deletion, or modification of a field in the selectively copied item of information, such that each selectively copied item of information is not identical to the original item of information, wherein the performance of the at least one field-level operation is based at least in part on a set of rules and at least one of content associated with the selectively copied item of information and a data structure associated with the selectively copied item of information;
   wherein the execution of the computer-executable instructions further results in the user interface providing controls for a user to define particular discrete flows and tracks, permissions associated with discrete flows, and operations to be performed by tracks on items of information being transmitted among discrete flows;
   wherein the execution of the computer-executable instructions further results in a third discrete flow being configured to allow at least a subplurality of a plurality of sources to publish items of information to the third discrete flow, the third discrete flow comprising a pool of items of information that multiple parties can read from and write to; and wherein the execution of the computer-executable instructions further results in the application of permissions associated with the third discrete flow, wherein a particular permission is defined via the user interface and comprises an indication of who may perform or not perform an action with respect to the third discrete flow, the permissions comprising:

(a) a definition indicating which of the plurality of sources are permitted or not permitted to publish items of information to the third discrete flow;

(b) a definition indicating who is permitted or not permitted to modify the data structure for items of information contained by the third discrete flow; and (c) a definition indicating who is permitted or not permitted to define rule-based operations to be performed on items of information contained by the third discrete flow.

2. The computing device of claim 1, wherein the selective copying of at least one item of information comprises copying at least one item of information having a value in the field that matches a specified value.

3. The computing device of claim 1, wherein the field is one of a required field and an optional field.

4. The computing device of claim 1, wherein at least one of the first discrete flow and the second discrete flow is owned by an application.

5. The computing device of claim 1, wherein one of the first discrete flow and the second discrete flow comprises content sourced from a community of identities.

6. The computing device of claim 1, wherein at least one of the first discrete flow and the second discrete flow is owned by an individual identity.

7. The computing device of claim 1, wherein one of the first discrete flow and the second discrete flow comprises reference information.

8. The computing device of claim 1, wherein at least one item of information is published to the first discrete flow by at least one of an application, an identity, a community system, and another discrete flow.

9. The computing device of claim 1, wherein the selective copying further comprises performing at least one rule-based operation on the at least one original item of information.

10. The computing device of claim 9 wherein the rule-based operation comprises at least one of transformation, enhancement, and redaction.

11. The computing device of claim 1, wherein the selective copying further comprises selectively copying at least two items of information from at least two discrete source flows to a discrete target flow.

12. The computing device of claim 1, wherein the selective copying further comprises selectively copying at least one item of information from a discrete source flow to at least two discrete target flows.

13. The computing device of claim 1, wherein the selective copying is performed automatically and in real-time.

14. The computing device of claim 1, wherein the execution of the computer-executable instructions further results in the definition of a relationship between the first discrete flow and the second discrete flow, wherein the definition comprises a track for listening for new items of information published to the first discrete flow and selectively copying at least one of the new items of information to the second discrete flow.

15. The computing device of claim 1, wherein the execution of the computer-executable instructions further results in the definition of permissions for an entity, the permissions indicating an ability of the entity to modify parameters associated with at least one flow in the plurality of flows.

16. The computing device of claim 15, wherein the parameters determine whether the at least one flow is discoverable by other flows in the plurality of flows.

17. A method, implemented on at least one computing device, for information exchange and routing, the at least one computing device comprising at least one memory storing computer-executable instructions and at least one processing unit for executing the computer-executable instructions stored in the memory, wherein the execution of the instructions results in the at least one computing device:

receiving commands from a user of the at least one computing device;

selectively providing items of information to third parties, the items of information being organized in discrete flows, each discrete flow comprising a pool of real-time content containing the items of information, each discrete flow having a defined data structure for items of information contained by the discrete flow, each defined data structure comprising a plurality of fields, each field requiring a particular type of content to be held in the field, with each individual item of information having at least one field of data, wherein the discrete flows comprise nodes in a graph and wherein a plurality of tracks comprise edges connecting discrete flows in the graph, wherein a particular track comprises a configurable pathway among a subplurality of the discrete flows that performs one or more operations on items of information being transmitted among the subplurality of discrete flows;

defining a track among a plurality of flows such that at least one original item of information in at least a first discrete flow is selectively copied to at least a second discrete flow, wherein the selective copying does not require that the first discrete flow or the selectively copied item have knowledge of the second discrete flow, and wherein the track, in copying the item of information, performs in real time at least one field-level operation on the at least one selectively copied item of information resulting in the addition, deletion, or modification of a field in the selectively copied item of information, such that at least one selectively copied item of information is not identical to the original item of information, wherein the performance of the at least one field-level operation is based at least in part on a set of rules and at least one of content associated with the selectively copied item of information and a data structure associated with the selectively copied item of information;

providing controls for a user to define particular discrete flows and tracks, permissions associated with discrete flows, and operations to be performed by tracks on items of information being transmitted among discrete flows;

allowing at least a subplurality of a plurality of sources to publish items of information to a third discrete flow, the third discrete flow comprising a pool of items of information that multiple parties can read from and write to; and applying permissions associated with the third discrete flow, wherein a particular permission is defined via a user interface and comprises an indication of who may perform or not perform an action with respect to the third discrete flow, the permissions comprising:
(a) a definition indicating which of the plurality of sources are permitted or not permitted to publish items of information to the third discrete flow;
(b) a definition indicating who is permitted or not permitted to modify the data structure for items of information contained by the third discrete flow; and
(c) a definition indicating who is permitted or not permitted to define rule-based operations to be performed on items of information contained by the third discrete flow.

18. The method of claim 17, wherein the selective copying of at least one item of information comprises copying at least one item of information having a value in the field that matches a specified value.

19. The method of claim 17, wherein the field is one of a required field and an optional field.

20. The method of claim 17, wherein at least one of the first discrete flow and the second discrete flow is owned by an application.

21. The method of claim 17, wherein one of the first discrete flow and the second discrete flow comprises content sourced from a community of identities.

22. The method of claim 17, wherein at least one of the first discrete flow and the second discrete flow is owned by an individual identity.

23. The method of claim 17, wherein one of the first discrete flow and the second discrete flow comprises reference information.

24. The method of claim 17, wherein at least one item of information is published to the first discrete flow by at least one of an application, an identity, a community system, and another discrete flow.

25. The method of claim 17, wherein the selective copying further comprises performing at least one rule-based operation on the at least one original item of information.

26. The method of claim 25, wherein the rule-based operation comprises at least one of transformation, enhancement, and redaction.

27. The method of claim 17, wherein the selective copying further comprises selectively copying at least two items of information from at least two discrete source flows to a discrete target flow.

28. The method of claim 17, wherein the selective copying further comprises selectively copying at least one item of information from a discrete source flow to at least two discrete target flows.

29. The method of claim 17, wherein the selective copying is performed automatically and in real-time.

30. The method of claim 17, wherein the execution of the instructions further results in the at least one computing device defining a relationship between the first discrete flow and the second discrete flow, wherein the definition comprises a track for listening for new items of information published to the first discrete flow and selectively copying at least one of the new items of information to the second discrete flow.

31. The method of claim 17, wherein the execution of the instructions further results in the at least one computing device defining permissions for an entity, the permissions indicating an ability of the entity to modify parameters associated with at least one flow in the plurality of flows.

32. The method of claim 31, wherein the parameters determine whether the at least one flow is discoverable by other flows in the plurality of flows.

33. The computing device of claim 1, wherein the permissions further comprise a definition indicating whether other flows are permitted to discover the third discrete flow and send items of information thereto.

34. The computing device of claim 1, wherein the permissions further comprise a definition indicating whether the third discrete flow is permitted to discover other flows and send items of information thereto.

35. The computing device of claim 1, wherein the permissions further comprise a definition indicating which items of information or portions thereof a user is permitted or not permitted to retrieve from the third discrete flow.

* * * * *